US010866020B2

(12) United States Patent
Hoti et al.

(10) Patent No.: US 10,866,020 B2
(45) Date of Patent: Dec. 15, 2020

(54) ICE CUBE EVAPORATOR PLATE ASSEMBLY

(71) Applicant: HOSHIZAKI AMERICA, INC., Peachtree City, GA (US)

(72) Inventors: Milaim Hoti, Peachtree City, GA (US); Tim Perry, Peachtree City, GA (US); Jim Kuo, Peachtree City, GA (US); Kevin Knatt, Saint Louis, MO (US)

(73) Assignee: Hoshizaki America, Inc., Peachtree City, GA (US)

( * ) Notice: Subject to any disclaimer, the term of this patent is extended or adjusted under 35 U.S.C. 154(b) by 97 days.

(21) Appl. No.: 16/164,301

(22) Filed: Oct. 18, 2018

(65) Prior Publication Data

US 2019/0056162 A1 Feb. 21, 2019

Related U.S. Application Data

(63) Continuation of application No. 14/022,887, filed on Sep. 10, 2013, now Pat. No. 10,107,538.
(Continued)

(51) Int. Cl.
*B21D 22/04* (2006.01)
*B21D 51/46* (2006.01)
(Continued)

(52) U.S. Cl.
CPC ............... *F25C 1/12* (2013.01); *B21D 22/04* (2013.01); *B21D 51/46* (2013.01); *B21D 51/48* (2013.01);
(Continued)

(58) Field of Classification Search
CPC ............. B21D 53/08; B23P 15/26; F25C 1/12
See application file for complete search history.

(56) References Cited

U.S. PATENT DOCUMENTS 2,014,703 A  9/1935 Smith
2,688,794 A * 9/1954 Malutich ................ B21D 53/08
29/890.038
(Continued)

FOREIGN PATENT DOCUMENTS

EP      2400243      12/2011
KR   1020150124222    11/2015
(Continued)

OTHER PUBLICATIONS

Melton, Glenn O'Neal; Non-Final Office Action for U.S. Appl. No. 16/172,042, filed Oct. 26, 2018, dated Apr. 16, 2019, 28 pgs.
(Continued)

*Primary Examiner* — Jacob J Cigna
(74) *Attorney, Agent, or Firm* — Taylor English Duma LLP

(57) ABSTRACT

A method of manufacturing an evaporator includes: forming a length of tubing into a serpentine path, the length of tubing forming a tubing coil; forming a first evaporator plate; forming a second evaporator plate; positioning the tubing coil between the first evaporator plate and the second evaporator plate; bringing the first evaporator plate, the second evaporator plate, and the tubing coil into contact with each other; and forming a plurality of dimples in each of the first evaporator plate and the second evaporator plate, thereby at least partially crushing the tubing coil at a position of each of the plurality of dimples, a surface of each of the dimples contacting the tubing coil.

18 Claims, 7 Drawing Sheets

Related U.S. Application Data

(60) Provisional application No. 61/699,171, filed on Sep. 10, 2012.

(51) Int. Cl.
| | |
|---|---|
| *B23P 15/26* | (2006.01) |
| *F25B 39/00* | (2006.01) |
| *F25B 39/02* | (2006.01) |
| *F25C 1/12* | (2006.01) |
| *F28D 1/047* | (2006.01) |
| *F28D 21/00* | (2006.01) |
| *F28F 1/22* | (2006.01) |
| *B21D 51/48* | (2006.01) |

(52) U.S. Cl.
CPC ............ *B23P 15/26* (2013.01); *F25B 39/00* (2013.01); *F25B 39/022* (2013.01); *F28D 1/0477* (2013.01); *F28F 1/22* (2013.01); *F25C 2500/02* (2013.01); *F28D 2021/0064* (2013.01); *Y10T 29/49396* (2015.01)

(56) References Cited

U.S. PATENT DOCUMENTS

| | | | |
|---|---|---|---|
| 3,280,585 A | 10/1966 | Lowe | |
| 3,511,059 A | 5/1970 | Hoenisch | |
| 3,650,121 A | 3/1972 | Kimpel et al. | |
| 4,158,908 A * | 6/1979 | Block | B21D 53/08 29/890.033 |
| 4,313,430 A * | 2/1982 | Britner | F24S 10/753 126/659 |
| 4,344,298 A | 8/1982 | Biemiller | |
| 4,366,679 A | 1/1983 | Van Steenburgh, Jr. | |
| 4,369,836 A * | 1/1983 | Bleckmann | F28F 1/22 165/171 |
| 4,412,429 A | 11/1983 | Kohl | |
| 4,417,450 A | 11/1983 | Morgan, Jr. et al. | |
| 4,442,681 A * | 4/1984 | Fischer | F25C 5/08 62/347 |
| 4,458,503 A | 7/1984 | Nelson | |
| 4,489,567 A | 12/1984 | Kohl | |
| 4,555,913 A | 12/1985 | Ishiguro | |
| 4,573,325 A | 3/1986 | Chiu et al. | |
| 4,580,410 A | 4/1986 | Toya | |
| 4,589,261 A | 5/1986 | Ohashi et al. | |
| 4,986,088 A | 1/1991 | Nelson | |
| 4,995,245 A | 2/1991 | Chang | |
| 5,060,484 A | 10/1991 | Bush et al. | |
| 5,097,897 A | 3/1992 | Watanabe et al. | |
| 5,182,925 A | 2/1993 | Alvarez et al. | |
| 5,291,752 A | 3/1994 | Alvarez et al. | |
| 5,345,782 A | 9/1994 | Takahashi et al. | |
| 5,479,707 A | 1/1996 | Alvarez et al. | |
| 5,586,439 A | 12/1996 | Schlosser et al. | |
| 5,941,091 A * | 8/1999 | Broadbent | F25B 39/024 165/135 |
| 6,148,621 A | 11/2000 | Byczynski et al. | |
| 6,161,396 A | 12/2000 | Allison et al. | |
| 6,205,807 B1 | 3/2001 | Broadbent | |
| 6,247,318 B1 | 6/2001 | Stensrud et al. | |
| 6,311,501 B1 * | 11/2001 | Allison | F25C 1/12 62/303 |
| 6,347,526 B1 | 2/2002 | Ledbetter | |
| 6,463,746 B1 | 10/2002 | Bethuy et al. | |
| 6,619,051 B1 | 9/2003 | Kilawee | |
| 6,725,675 B2 | 4/2004 | Kampert et al. | |
| 6,742,576 B2 | 6/2004 | Bergevin | |
| 6,854,282 B2 * | 2/2005 | Bethuy | F25D 31/003 222/146.6 |
| 7,017,355 B2 | 3/2006 | Allison et al. | |
| 7,243,508 B2 | 7/2007 | Sanuki et al. | |
| 7,281,385 B2 | 10/2007 | Wakatsuki | |
| 7,340,913 B2 | 3/2008 | Miller et al. | |
| 7,556,236 B2 | 7/2009 | Slappay | |
| 7,703,299 B2 * | 4/2010 | Schlosser | F25B 39/02 165/171 |
| 7,779,641 B2 | 8/2010 | Lee et al. | |
| 8,635,877 B2 | 1/2014 | Kim et al. | |
| 8,677,774 B2 * | 3/2014 | Yamaguchi | F25C 1/12 62/340 |
| 8,677,777 B2 | 3/2014 | Yamaguchi et al. | |
| 8,857,198 B2 | 10/2014 | Styn et al. | |
| 9,017,485 B2 | 4/2015 | Murthy et al. | |
| 9,056,337 B2 | 6/2015 | Walker et al. | |
| 9,604,324 B2 | 3/2017 | An et al. | |
| 9,643,742 B2 | 5/2017 | Metzger | |
| 9,644,879 B2 | 5/2017 | Broadbent | |
| 9,688,423 B2 | 6/2017 | Metzger | |
| 9,719,710 B2 | 8/2017 | Yang | |
| 9,733,003 B2 | 8/2017 | Hoti | |
| 9,803,907 B2 | 10/2017 | Erbs et al. | |
| 9,845,982 B2 | 12/2017 | Knatt | |
| 9,857,117 B2 | 1/2018 | Kim | |
| 9,863,682 B2 | 1/2018 | Broadbent | |
| 9,869,502 B2 | 1/2018 | Gardner et al. | |
| 9,933,195 B2 | 4/2018 | Roth et al. | |
| 9,939,186 B2 | 4/2018 | Roth et al. | |
| 10,107,538 B2 | 10/2018 | Hoti et al. | |
| 10,113,785 B2 | 10/2018 | Melton et al. | |
| 10,458,692 B2 | 10/2019 | Melton et al. | |
| 2004/0026599 A1 | 2/2004 | Lacan et al. | |
| 2005/0252233 A1 | 11/2005 | Sanuki et al. | |
| 2006/0032263 A1 * | 2/2006 | Sanuki | F25C 1/12 62/340 |
| 2007/0101753 A1 * | 5/2007 | Broadbent | F25C 5/08 62/349 |
| 2008/0264090 A1 | 10/2008 | Sowa et al. | |
| 2009/0100847 A1 | 4/2009 | Moon et al. | |
| 2009/0165492 A1 | 7/2009 | Wilson et al. | |
| 2010/0250005 A1 | 9/2010 | Hawkes et al. | |
| 2010/0257886 A1 | 10/2010 | Suzuki et al. | |
| 2011/0005263 A1 * | 1/2011 | Yamaguchi | F25C 1/12 62/347 |
| 2011/0162641 A1 * | 7/2011 | Bitter | F24S 10/755 126/661 |
| 2012/0031135 A1 | 2/2012 | Schill | |
| 2014/0138065 A1 | 5/2014 | Hoti | |
| 2015/0219380 A1 | 8/2015 | Murthy et al. | |
| 2015/0375349 A1 | 12/2015 | Gotterbarm et al. | |
| 2016/0054043 A1 | 2/2016 | Broadbent | |
| 2016/0081365 A1 | 3/2016 | Bertone | |
| 2016/0290697 A1 | 10/2016 | Broadbent et al. | |
| 2016/0298892 A1 | 10/2016 | Matsumoto | |
| 2016/0298893 A1 | 10/2016 | Knatt et al. | |
| 2016/0298894 A1 | 10/2016 | Matsumoto | |
| 2016/0370061 A1 | 12/2016 | Erbs | |
| 2017/0067678 A1 | 3/2017 | Melton et al. | |
| 2017/0122643 A1 | 5/2017 | Cravens et al. | |
| 2017/0176077 A1 | 6/2017 | Knatt | |
| 2017/0205129 A1 | 7/2017 | Metzger | |
| 2017/0227274 A1 | 8/2017 | Almblad | |
| 2017/0370628 A1 | 12/2017 | Knatt | |
| 2018/0017304 A1 | 1/2018 | Knatt | |
| 2018/0031294 A1 | 2/2018 | Olson, Jr. et al. | |
| 2018/0038623 A1 | 2/2018 | Hoti | |
| 2018/0058743 A1 | 3/2018 | Vorosmarti, III et al. | |
| 2018/0106521 A1 | 4/2018 | Broadbent et al. | |
| 2019/0063814 A1 | 2/2019 | Melton et al. | |

FOREIGN PATENT DOCUMENTS

| | | |
|---|---|---|
| WO | 2009134102 | 11/2009 |
| WO | 2018011711 | 1/2018 |

OTHER PUBLICATIONS

Hoti, Milaim; Advisory Action for U.S. Appl. No. 14/022,887, filed Sep. 10, 2013, dated May 11, 2017, 3 pgs.

Hoti, Milaim; Advisory Action for U.S. Appl. No. 14/022,887, filed Sep. 10, 2013, dated Nov. 2, 2017, 6 pgs.

(56) References Cited

OTHER PUBLICATIONS

Hoti, Milaim; Applicant Interview Summary for U.S. Appl. No. 14/022,887, filed Sep. 10, 2013, dated Mar. 21, 2017, 3 pgs.

Hoti, Milaim; Applicant-Initiated Interview Summary for U.S. Appl. No. 14/022,887, filed Sep. 10, 2013, dated Mar. 12, 2018, 3 pgs.

Hoti, Milaim; Final Office Action for U.S. Appl. No. 14/022,887, filed Sep. 10, 2013, dated Mar. 2, 2017, 8 pgs.

Hoti, Milaim; Final Office Action for U.S. Appl. No. 14/022,887, filed Sep. 10, 2013, dated Jun. 22, 2017, 10 pgs.

Hoti, Milaim; Issue Notification for U.S. Appl. No. 14/022,887, filed Sep. 10, 2013, dated Oct. 3, 2018, 1 pg.

Hoti, Milaim; Non-Final Office Action for U.S. Appl. No. 14/022,887, filed Sep. 10, 2013, dated Dec. 15, 2017, 12 pgs.

Hoti, Milaim; Notice of Allowance for U.S. Appl. No. 14/022,887, filed Sep. 10, 2013, dated Jun. 8, 2018

Hoti, Milaim; Supplemental Notice of Allowance for U.S. Appl. No. 14/022,887, filed Sep. 10, 2013, dated Sep. 24, 2018, 9 pgs.

Hoti, Miliam; Non-Final Office Action for U.S. Appl. No. 14/022,887, filed Sep. 20, 2013, dated Sep. 21, 2016, 12 pgs.

Hoti, Miliam; Restriction Requirement for U.S. Appl. No. 14/022,887, filed Sep. 20, 2013, dated Jul. 6, 2016, 10 pgs.

Melton, Glenn O'Neal; Applicant-Initiated Interview Summary for U.S. Appl. No. 15/353,833, filed Nov. 17, 2016, dated Mar. 13, 2018, 3 pgs.

Melton, Glenn O'Neal; Issue Notification for U.S. Appl. No. 15/353,833, filed Nov. 17, 2016, dated Oct. 10, 2018, 1 pg.

Melton, Glenn O'Neal; Non-Final Office Action for U.S. Appl. No. 15/353,833, filed Nov. 17, 2016, dated Jan. 3, 2018, 22 pgs.

Melton, Glenn O'Neal; Notice of Allowance for U.S. Appl. No. 15/353,833, filed Nov. 17, 2016, dated Jun. 28, 2018, 15 pgs.

Melton, Glenn O'Neal; Supplemental Notice of Allowance for U.S. Appl. No. 15/353,833, filed Nov. 17, 2016, dated Sep. 14, 2018, 9 pgs.

Melton, Glenn O'Neal; Extended European Search Report for serial No. 17202170.1, filed Nov. 16, 2017, dated Apr. 5, 2018, 9 pgs.

Melton, Glenn O'Neal; Applicant-Initiated Interview Summary for U.S. Appl. No. 16/172,042, filed Oct. 26, 2018, dated Jul. 12, 2019, 8 pgs.

Melton, Glenn O'Neal; Notice of Allowance for U.S. Appl. No. 16/172,042, filed Oct. 26, 2018, dated Jul. 31, 2019, 9 pgs.

\* cited by examiner

ICE CUBE EVAPORATOR PLATE ASSEMBLY

CROSS-REFERENCE TO RELATED APPLICATIONS

This application is a continuation of U.S. application Ser. No. 14/022,887, filed Sep. 10, 2013, which issued into U.S. Pat. No. 10,107,538 on Oct. 23, 2018, which claims the benefit of U.S. Provisional Application No. 61/699,171 filed Sep. 10, 2012, both of which are incorporated by reference herein in their entireties.

BACKGROUND OF THE INVENTION

The present invention relates to an evaporator plate assembly for use in an ice making machine. In particular, the present invention relates to an evaporator plate assembly having a pair of dimpled plates between which a serpentine tube is positioned, the plates being spot welded to each other.

DESCRIPTION OF RELATED ART

Automatic ice making machines are well known and are typically found in food and drink service establishments, hotels, motels, sports arenas and various other places where large quantities of ice are needed on a continuous basis. Some automatic ice making machines produce flaked ice while others produce ice shaped in a variety of configurations, which are commonly referred to as cubes or nuggets.

Automatic ice making machines generally include a refrigeration system having a compressor, a condenser, and an evaporator; a series of individual ice forming locations which may or may not be referred to as pockets; and a water supply system. In a typical ice making machine, the evaporator section of the refrigeration system is connected to the series of individual ice forming locations wherein the individual ice forming locations are directly cooled by the refrigeration system. Water may either be supplied to fill the ice forming locations if the ice forming locations are in the form of a series of pockets, or water may be supplied to the ice forming locations by having the water trickle over or be sprayed onto the individual ice forming locations. The run-off of the trickled or sprayed water is usually recirculated within the water supply. The trickling or spraying methods of supplying water are normally preferred because the methods produce clear ice while the static filled pockets method generally produces white or opaque ice.

Automatic ice making machines are normally controlled by the level or supply of ice in the storage portion of the ice making machine. When the supply of ice in the storage portion is insufficient, automatic controls cycle the ice making machine through ice production and ice harvest modes to supplement the supply of ice in the storage portion. In the production mode, the refrigeration system operates in a normal manner such that expanding refrigerant in the evaporator removes heat from the series of ice forming locations, freezing the water to form an ever growing layer of ice. When the ice thickness reaches a predetermined condition or a specified time period has elapsed, the ice making machine switches to harvest mode.

Typically the harvest mode involves a valve change which directs hot refrigerant gasses to the evaporator. The ice forming locations are heated by the hot refrigerant gasses until the ice in contact with the evaporator begins to thaw. Once the ice eventually falls from the evaporator, the refrigeration system is changed back to production mode, and the cycle begins again. The ice making machine continues to cycle between the production mode and the harvest mode until some type of sensing system in the storage portion signals the refrigeration system to pause.

Conventionally, evaporators are formed by bonding evaporator tubes and partitions to a base wall. The evaporator tubes and the base wall are normally made of copper, which is then plated with tin to protect the copper from oxidation. Forming the copper tubes may create residual stresses in the copper, which may cause cracks with rapid expansion and contraction continuously seen in evaporators.

If copper tubes are left untreated, the tubes corrode over time due to moisture containing dissolved oxygen. The resulting film from this oxidation can flake off into the circulation tank. The tin coating shields the tubes from this harmful process. However, high heat added during the forming process or exposure to high chlorine environments can accidently remove the protective layer in localized areas.

Moreover, the use of copper material for the tubes presents additional issues. For example, the copper must be pre-cleaned by dipping the copper in a chemical or acid cleaning bath and then coated with tin; which results in high lab and manufacturing costs, as well as potentially making workers ill from the fumes emanating from the various chemicals and the like. A tin tape is then laid over the corresponding portions of the respective front and back evaporator plates. The tin plated copper tube is then placed between the tin tape on each evaporator plate and the evaporator plates and tin plated copper tube are joined or sandwiched together, and the assembly is then brazed together.

The manufacturing process is rather time consuming, exhausts high amounts of raw materials, such as water, chemicals, and copper and tin, and is therefore also relatively expensive.

BRIEF DESCRIPTION OF THE DRAWING FIGURES

DETAILED DESCRIPTION OF PREFERRED EMBODIMENTS

Figure 1A:
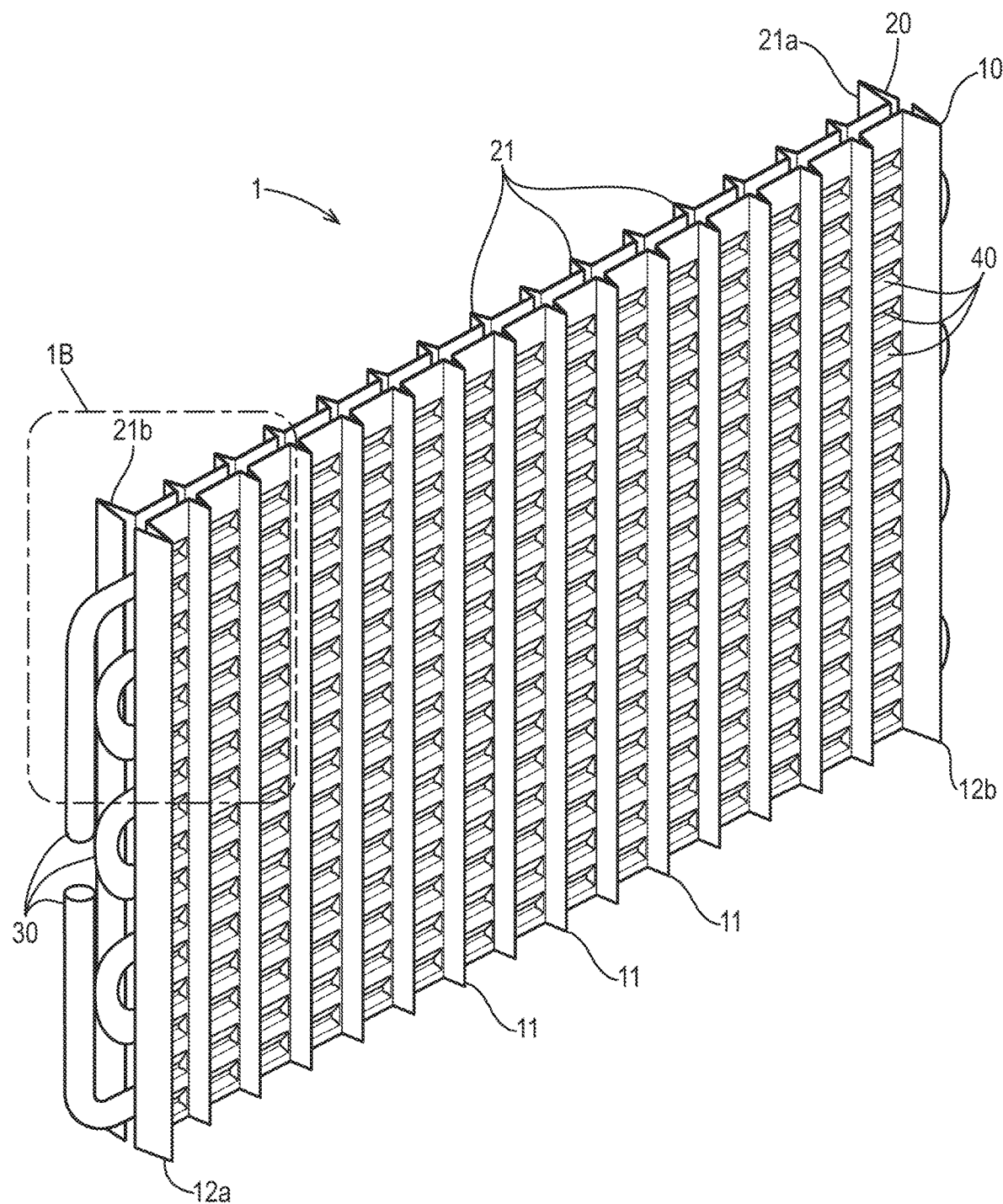
FIG. 1A is an isometric view of an evaporator plate assembly according to a preferred embodiment of the invention and that is preferably incorporated into an ice making machine.

The assembly 1 includes a first evaporator plate 10 joined to a second evaporator plate 20 with serpentine tubing 30 disposed between the first and second evaporator plates 10, 20. Preferably, the first and second evaporator plates 10 and 20 are made of stainless steel, however, it is within the scope of the present invention for the tubing 30 to be manufactured from copper that is dipped in tin.

Of course, it is also within the scope of the invention for the plate 10, 20 and tubing 30 to be manufactured from any other suitable material, now known or to be developed in the future, that provides, at a minimum, the desired benefits and performance of stainless steel and/or copper dipped in tin.

Each plate 10, 20 includes a plurality of ice forming locations 40, which may also be interchangeably referred to herein as dimples, wells, and the like. As shown in FIG. 1, the first plate 10 includes a plurality of dimples 40 separated from neighboring dimples 40, on left and right sides, by vertically extending fins 11. Preferably, the width between neighboring fins 11, 11 is approximately 35 mm as measured from a peak of one fin 11 to a peak of a neighboring fin 11. An inside width between neighboring fins 11, 11, measured from opposing faces of the neighboring fins 11, 11 is approximately 29 mm to 30 mm. A left end of the first plate 10 includes a rib 12a, and a right end of the first plate 10 includes another rib 12b, which opposes the rib 12a. It should be noted that while the ribs 12a and 12b are preferably of the same or uniform height relative to each other, the ribs 12a and 12b have a greater vertical height compared to each of the fins 11, 11.

Similarly, the second plate 20 includes a plurality of dimples 40 that are separated from neighboring dimples 40 by fins 21, 21, which are configured in the same manner as the fins 11, 11 of the first plate 10. Also, the left and right ends of the second plate 20 have ribs 21a and 21b, which oppose each other. Moreover, the rib 12a of the first plate 10 faces away from the rib 21b of the second plate 20, while the rib 12b of the first plate faces away from the rib 21a of the second plate 20. See FIG. 1 for above-described configuration.

The plates 10, 20 may be manufactured by any process now known or to be developed in the future. Preferably, a blank sheet of stainless steel having suitable proportions, including length, width and thickness, is fed into an appropriate apparatus or machine wherein the sheet is at least one of folded, pressed, die-stamped, milled, and the like to form the ribs 12a, 12b and 21a, 21b, and fins 11, 21. Either concurrently or subsequent to the formations of the ribs 12a, 12b and 21a, 21b and fins 11, 21, the dimples 40 are formed in each of the plates 10, 20 between neighboring pairs of fins 11, 21.

Figure 1B:
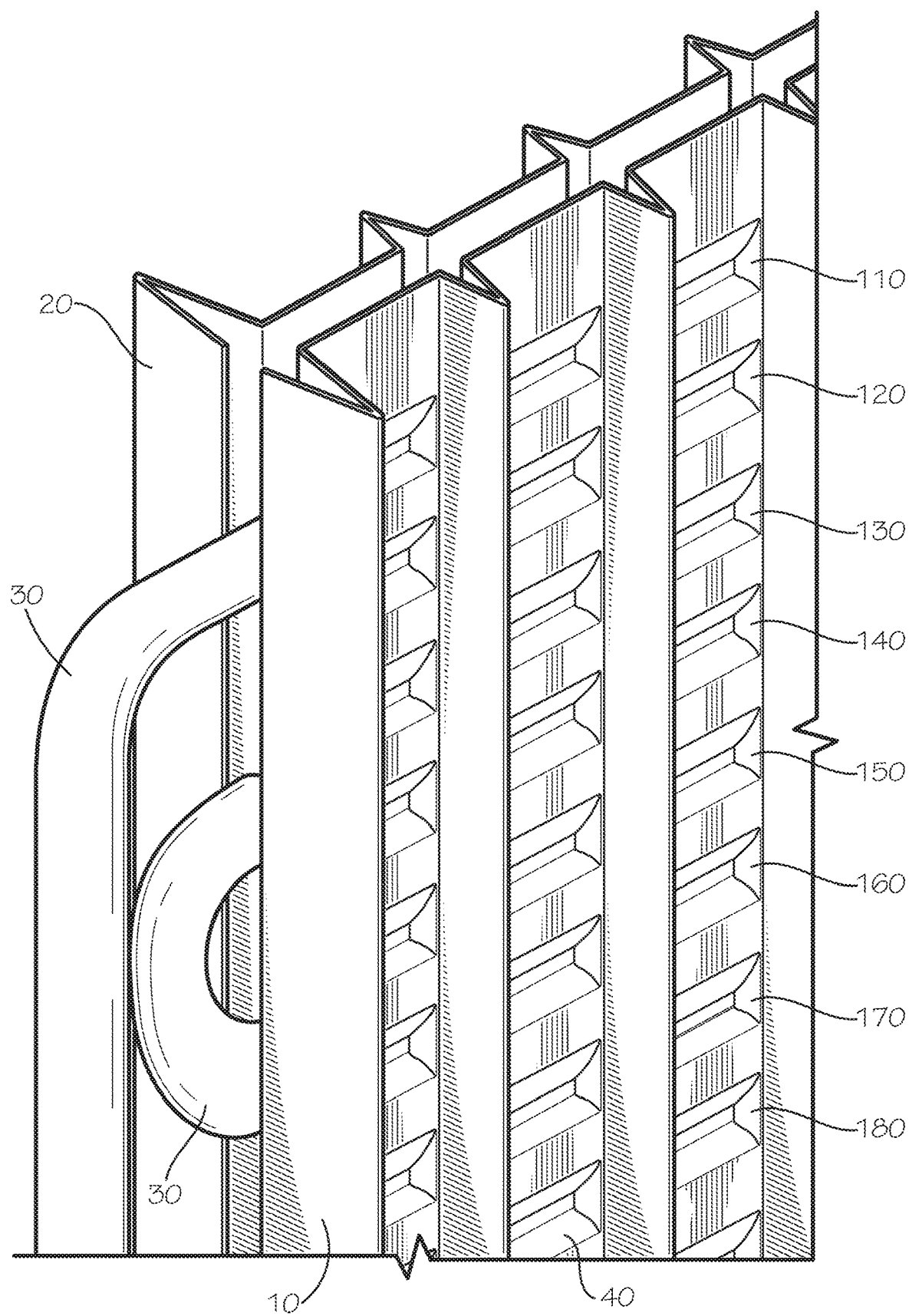
FIG. 1B is a detail view of the evaporator plate assembly of FIG. 1A taken from Detail 1B of FIG. 1A.
Figure 2:
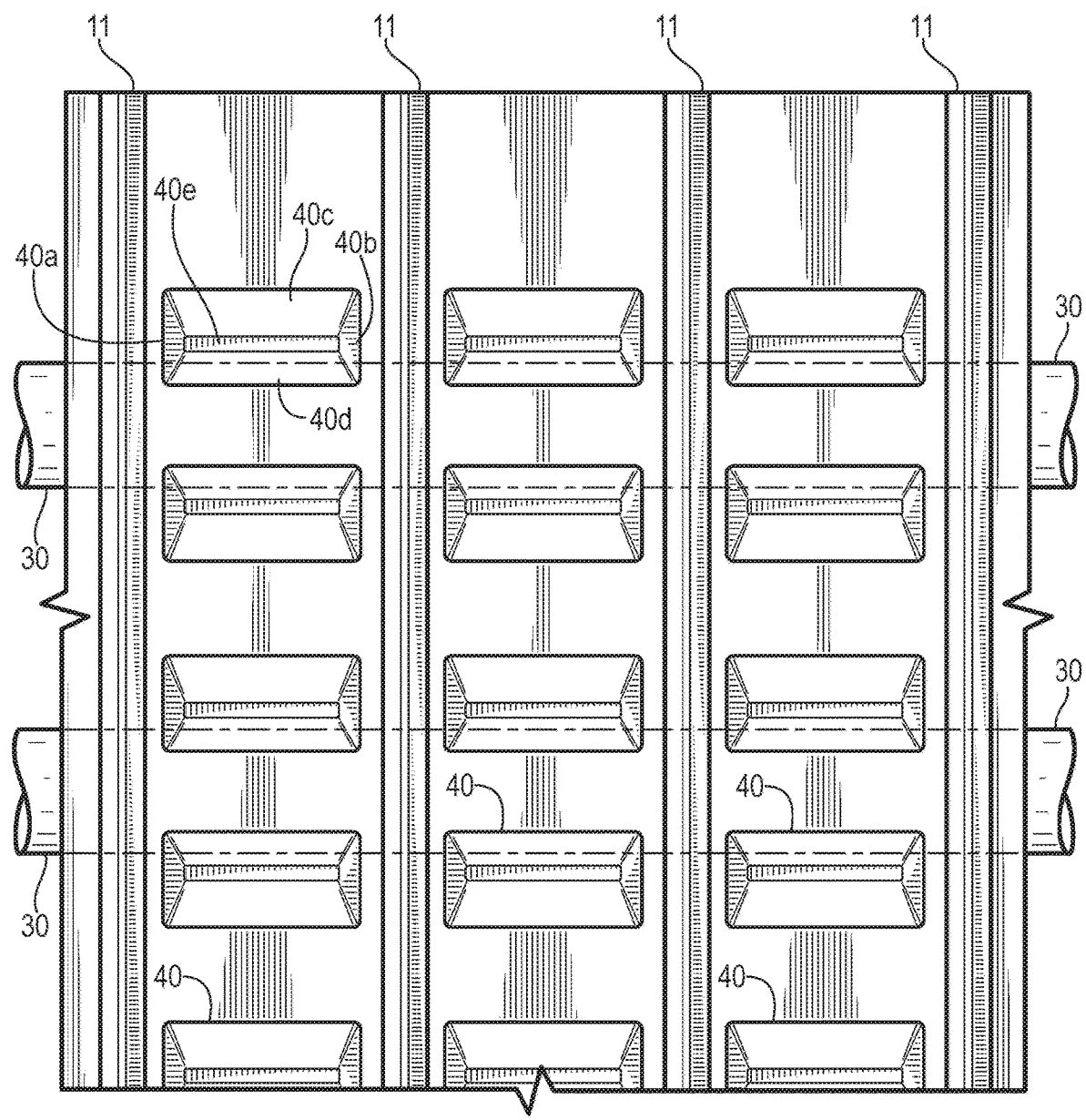
FIG. 2 is an enlarged front view of an evaporator plate showing a plurality of dimples arranged between a plurality of ribs.
Figure 3:
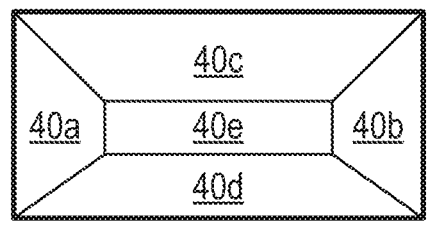
FIG. 3 is a schematic diagram illustrating end and side faces of a representative dimple.

Turning to FIG. 2, which is a front view of an enlarged portion of the assembly 1 shown in FIG. 1, a plurality of dimples 40 are illustrated. Although the side and end faces described below are actually curved when viewed from the side, when viewed from above, each dimple 40 is defined by a pair of opposing pyramid shaped end faces 40a and 40b, a pair of trapezoidal shaped left and right side faces 40c and 40d, and a substantially planar valley 40e. Opposing ends of the valley 40e connect the end faces 40a and 40b, while opposing left and right side faces of the valley 40e connect the side faces 40c and 40d. FIG. 3 is a schematic diagram illustrating the end faces 40a, 40b, side faces 40c, 40d, and valley 40e. It should be noted that it is also within the scope of the present invention for the dimples 40 to be free of the planar valley 40e such that the opposing side faces 40c and 40d directly abut against each other (not shown).

As shown in FIGS. 1A and 1n FIG. 1B, a detail view taken from FIG. 1A, a top row or straight portion—which can be described as a first row or straight portion—of the tubing 30 can pass between a first adjacent pair of rows of dimples 40 comprising a first row 110 and a second row 120. A second row or straight portion of the tubing 30 can pass between a second adjacent pair of rows of dimples 40 comprising a third row 130 and a fourth row 140. A third row or straight portion of the tubing 30 can pass between a third adjacent pair of rows of dimples 40 comprising a fifth row 150 and a sixth row 160. A fourth row or straight portion of the tubing 30 can pass between a fourth adjacent pair of rows of dimples 40 comprising a seventh row 170 and an eighth row 180. Likewise, additional rows or straight portions of the tubing 30 can pass between additional adjacent pairs of rows of dimples 40.

As also clearly shown in FIGS. 1A and 1n FIG. 1B, the evaporator plate assembly 1 can comprise the plate 10,20 and a serpentine tubing coil comprising the tubing 30. Each of the plates 10, 20, which can be respective first and second plates, can have opposing front and rear surfaces. Each of the plates 10, 20 can define a plurality of dimples 40. Each of the plurality of dimples 40 can project outwardly from the rear surface and can be disposed on the front surface in an array comprising a plurality of rows and a plurality of columns. Each of the plurality of rows can extend in a horizontal direction, and each of the plurality of columns can extend in a vertical direction. Each of the plates 10, 20 can comprise a plurality of fins 11, 21 projecting outwardly from the front surface of the plate 10, 20, in which case each fin 11, 21 can extend in the vertical direction and can be disposed between adjacent columns of dimples 40. The plurality of rows of dimples 40 can comprise a first row 110 of dimples 40, a second row 120 of dimples 40 disposed immediately adjacent to the first row 110 of dimples 40 in the vertical direction, a third row 130 of dimples 40 disposed immediately adjacent the second row 120 of dimples 40 in the vertical direction, and a fourth row 140 of dimples 40 disposed immediately adjacent to the third row 130 of dimples 40 in the vertical direction.

The serpentine tubing coil, which can be made from the tubing 30, can comprise straight portions of tubing extending horizontally and connected serially at their ends by connecting portions. The straight portions of the tubing coil 30 can comprise a first straight portion and a second straight portion connected to the first straight portion and being immediately adjacent to the first straight portion in the vertical direction. The second straight portion can be connected to the first straight portion by a first connecting portion of the connecting portions. The tubing 30 can be in contact with the rear surface of the plate, the first straight portion of the tubing coil 30 can be disposed between the first row 110 of the dimples 40 and the second row 120 of the dimples 40, and the second straight portion can be disposed between the third row 130 of the dimples 40 and the fourth row 140 of the dimples 40. Likewise, additional straight portions of the tubing 30 can pass between additional adjacent pairs of rows of the dimples 40. In addition to the first row 110, the second row 120, the third row 130, and the fourth row 140 of the dimples 40; each of the plates 10, 20 can further comprise the fifth row 150, the sixth row 160, the seventh row 170, and the eight row 180 of the dimples 40. Each of the straight portions of the tubing 30 can be positioned immediately adjacent to any other straight portion of the tubing 30. Likewise, with the assembly 1 as oriented in FIG. 1A, any of the rows of dimples can be positioned immediately adjacent to any other row of dimples in a vertical direction, and any of the columns of dimples can be positioned immediately adjacent to any other column of dimples in a horizontal direction.

Figure 4:
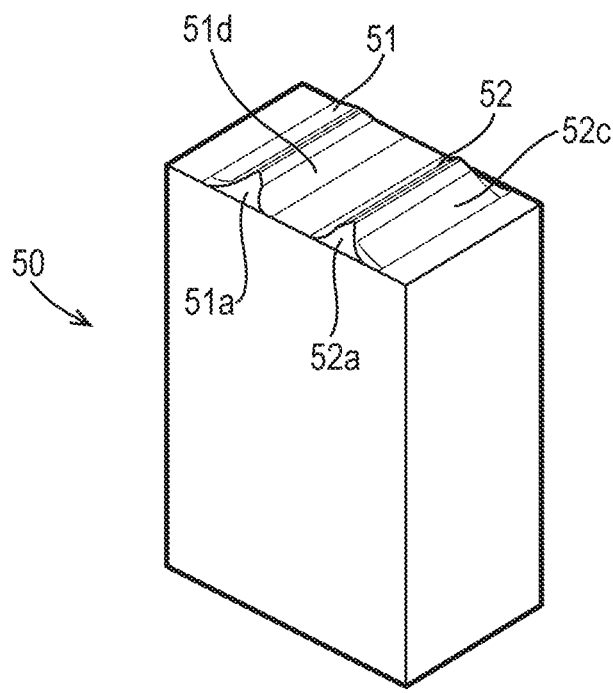
FIG. 4 is a perspective view of a dimple forming tool.

FIG. 4 is a perspective view of a dimple forming tool 50 that is used to form the dimples 40 in the plates 10, 20. The dimple forming tool 50 includes first and second dimple dies 51 and 52, respectively, projecting from an upper surface of the tool 50.

Figure 5:
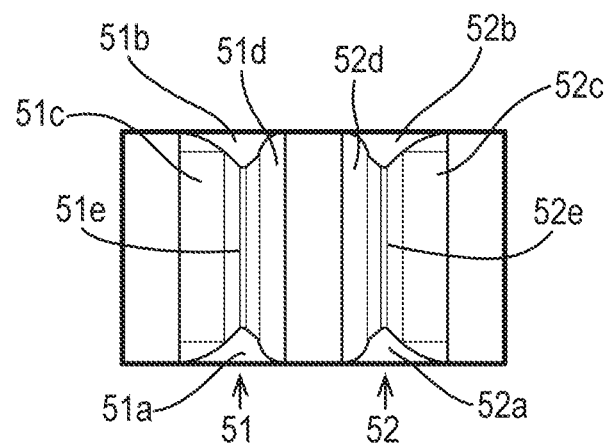
FIG. 5 is a top plan view of an upper surface of the dimple making tool shown in FIG. 4, wherein a plurality of dimple dies are shown on the upper surface of the tool.
Figure 6:
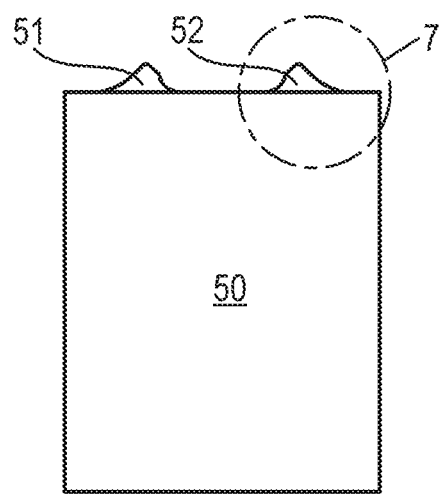
FIG. 6 is a first side view of the dimple making tool shown in FIG. 4.
Figure 7:
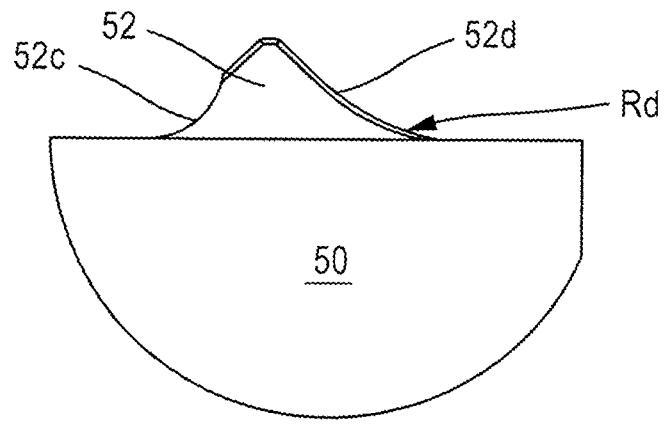
FIG. 7 is an enlarged view of a dimple die shown in FIG. 6 taken from detail 7 of FIG. 6.

Referring to FIG. 5, which is a top plan view of the tool 50 shown in FIG. 4, the first and second dimple dies 51 and 52 include opposing inner sloped surfaces 51d and 52d. As shown in FIGS. 6 and 7, each of the inner sloped surfaces 51d and 52d has a radius Rd that is in a range of between 30° and 60°, but preferably between 40° and 50°, and even more preferably has a radius of 43°. The inner sloped surfaces 51d and 52d form the side face 40d of each dimple 40.

Outer sloped surfaces 51c and 52c of the first and second dimple dies 51 and 52 face away from each other and form the side face 40c of each dimple 40. Opposing sloped ends 51a and 51b and 52a and 52b of the dimple dies 51 and 52, respectively, form the end faces 40a and 40b of each dimple 40. The apex of each dimple die 51 and 52, includes a substantially planar surface 51e and 52e which form the valleys 40e, 40e of each dimple 40, 40. For the embodiment of the dimple 40 that is free of the planar valley 40e, the dimple dies 51 and 52 are similarly formed to be free of the corresponding planar surfaces 51e and 52 which form the valleys 40e, 40e.

Moreover, opposing side faces of the planar surfaces 51e and 52e of each die 51 and 52, respectively, join the inner sloped surface 51d and 52d to the outer sloped surfaces 51c and 52c, respectively. Moreover, opposing ends of the planar surfaces 51e and 52e of each die 51 and 52, respectively, join the sloped ends 51a and 52a to their corresponding other sloped ends 51b and 52b, respectively. In the embodiment of the die 50 that is free of the planar surfaces 51e and 52e, the outer sloped surfaces 51c and 52c directly abut against corresponding inner sloped surfaces 51d and 52d.

Figure 8:
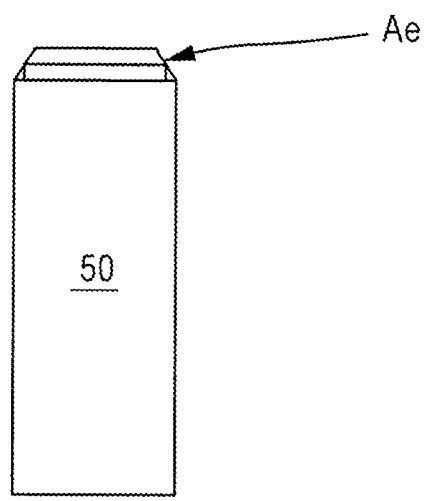
FIG. 8 is a second side view of the dimple making tool shown in FIG. 4.

As shown in FIG. 8, which is a side view of the dimple die 50, each of the sloped ends 51a and 52a and 51b and 52b has an angle Ae that is in a range of between 30° and 60°, but preferably between 40° and 50°, and even more preferably has an angle of 47°.

To manufacture the evaporator plate assembly 1, the plates 10 and 20 are first manipulated to form the fins 11 and 21 and ribs 12a, 12b and 21a, 21b, respectively, in the manner discussed above. The tubing 30 is then positioned between the plates 10 and 20, and the plates 10 and 20 are then welded to each other and/or to the tubing 30. It is within the scope of the present invention for the plates 10, 20 and tubing 30 to be welded using any welding method now known or to be developed in the future, but it is preferable that the plates 10, 20 and tubing 30 are joined by one of spot welding, ultrasonic welding, cold welding, and the like. It is also within the scope of the present invention for the plates 10, 20 and tubing 30 to be joined using mechanical joining techniques, such as a slot and groove system, and clamping the plates 10, 20 together in a manner that fixedly secures the tubing 30 between the plates 10, 20.

Subsequent to the joining of the plates 10, 20 and tubing 30, the dimple forming tool 50 (shown, e.g., in FIG. 4) is used to form the dimples 40 in the plates 10, 20 while simultaneously crushing the tubing 30 there between. It is also within the scope of the present invention for the dimples 40 to be formed concurrently or at the same time as when the plates 10, 20 and tubing 30 are joined together.

Figure 9:
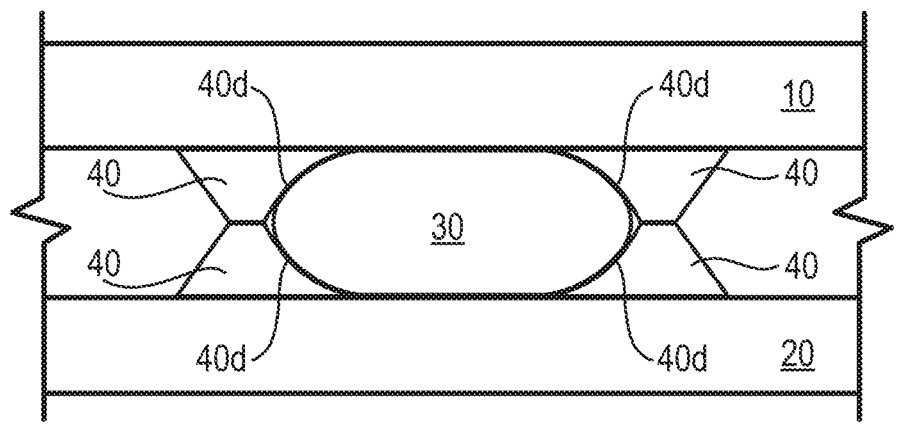
FIG. 9 is a cross-sectional view of dimples formed in opposing evaporator plates welded to crushed tubing provided between the evaporator plates.

Referring to FIG. 9, it can be seen that the dimples 40 are formed by the first and second dimple dies 51 and 52 of the dimple forming tool 50, wherein the dimples 40, 40 of the plates 10 and 20, completely surround the tubing 30, which increases the heat transfer area, translates to high ice production and is more efficient than conventional evaporator plate assemblies. Turning to FIG. 2, it can be seen that each pair of dimples 40, 40 is formed around or above and below the tubing 30 (when view from the front of each plate 10, 20) passing between the dimples 40, 40 along the back surface of each plate 10, 20. Returning back to FIG. 9, the tubing 30, which has a circular cross-sectional shape (not shown) before the tool 50 forms the dimples 40, 40 in the plates 10 and 20, is flattened or crushed into an oval shape once the dimples 40, 40 are formed.

Furthermore, the radius Rd of the inner sloped surfaces 51d and 52d of the dimple dies 51 and 52, respectively, results in an outer surface of the side face 40d of each dimple 40 having the same radius Rd, such that the outer surface of each side face 40d provides a fairly snug or tight fit with a corresponding outer surface of the crushed or flattened tubing 30. As can be seen in FIG. 9, a substantial, and preferably entire, portion of the outer surface of the crushed tubing 30 is in direct contact with an aspect of the plates 10 and 20. The above-described structural configuration of the dimples 40, 40 relative to the crushed tubing 30 provides an increased surface area, which results in the water passing over the plates 10, 20 and dimples 40, 40 freezing faster, which ultimately produces a faster harvest of ice cubes Ic with a substantial increase in the amount of ice cubes Ic being harvested per refrigeration cycle.

In operation, once the evaporator plate assembly 1 is installed in a refrigeration system, whether conventional or developed in the future, during the ice making operation or production mode, water is directed from the top of each plate 10 and 20, down the channels defined by the neighboring vertically extending fins 11, 11 and 21, 21, and over the dimples 40. Expanding refrigerant passing through the tubing 30 freezes the water passing over the dimples 40.

Figure 10:
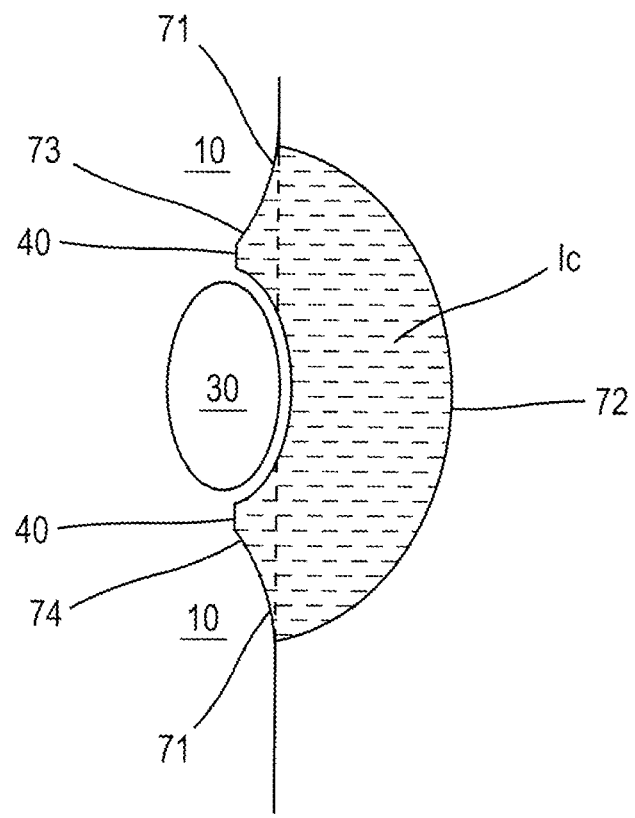
FIG. 10 is a cross-sectional view of FIG. 9 showing a schematic diagram of an ice nugget formed in a pair of dimples located above and below a crushed portion of the tubing.

As shown in FIG. 10, which is a cross-sectional view that is orthogonal relative to the cross-sectional view of FIG. 9, wherever there is tubing 30 passing behind the plate 10, an ice cube or nugget Ic is formed. The ice cube Ic initially begins with a flat back surface 71, which is essentially parallel to an upper surface of the plate 10 but eventually becomes rounded around the tube 30 such that the ice cube Ic can be described as having a crescent shaped front surface 72. Furthermore, the back surface 71 of the ice also includes a pair of projections or legs 73, 74 that are formed by the water in the dimples 40, 40 freezing.

The above-described ice-making process is carried out such that the exposed surface of each of the plates 10 and 20 is entirely or at least substantially covered with ice cubes Ic. Preferably, there is a water tank beneath the evaporator plate assembly 1 to catch run-off water falling from the plates 10, 20. The run-off water is then recycled through the refrigeration system and over the plates 10, 20 until it is determined that there is an insufficient amount of water left in the circulation tank due to the amount of ice cubes Ic formed on the plates 10, 20.

The refrigeration system then switches from production mode to harvesting mode, during which a hot gas is directed through the tubing 30 and/or water passes between the plates over the tubing 30. The projections 73, 74 of each ice cube Ic then fall or slide out of a corresponding dimple 40 and the cube Ic is collected in a bin (not shown) below the plates 10, 20. An innovative aspect of the crescent shaped front surface 72 and projections 73, 73 extending from the substantially flat back surface 71 prevent neighboring ice cubes Ic from sticking to each other in the collection bin (not shown).

Current conventional evaporator plate assemblies use copper tubes that are coated with tin according to NSF requirements. The brazing, acid washing and coating of the copper tubes result in high labor and material costs, not to mention causing illness to laborers from inhaling or making skin contact with the various chemicals involved in such processes. The all stainless steel aspect of the above-described innovative evaporator plate assembly 1, according to a preferred embodiment of the invention, eliminates tin-tape, brazing and tin-plating while being able to maintain or increase production of the ice nuggets Ic. Moreover, the all stainless steel evaporator plate assembly 1 eliminates all of the chemicals used for fluxing prior to tin plating of the tubes, eliminates all chemicals needed for acid cleaning of the tubing, eliminates tin silver solder needed for joining the evaporator plates and tube plating, saves energy due to elimination of the infrared oven need to heat the conventional plate and tubing assembly process, greatly reduces water use, and greatly reduces air make up and exhaust air requirements. In essence, the innovative evaporator plate assembly 1 provides a more environmental friendly assembly than is currently available in the marketplace.

Furthermore, the all stainless steel aspect of the evaporator plate assembly 1 presents possibilities wherein each assembly 1 may easily be removed from the refrigeration system by a technician to be cleaned, serviced and possibly even replaced.

While the preferred embodiment of the evaporator plate assembly 1 described above includes components which are all made of stainless steel, as an innovative aspect of the invention is the configuration of the dimples relative to the crushed tubing between the evaporator plates, it is also within the scope of the present invention to provide an embodiment having a copper tube that is plated with tin.

Figure 11:
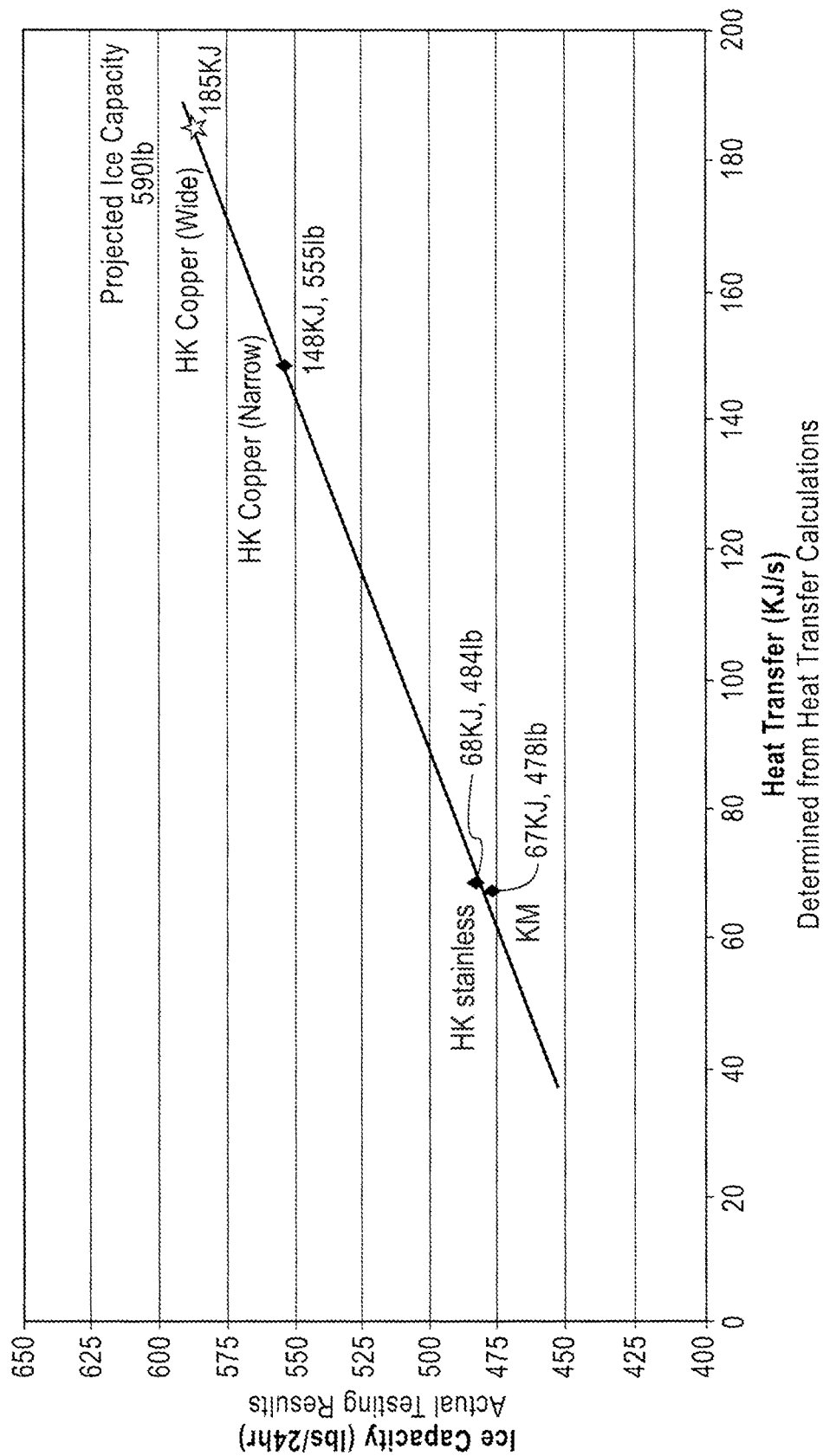
FIG. 11 is a graph comparing the ice manufacturing capabilities of conventional evaporator plate assemblies relative to the first and second embodiment of the present invention.

That is, instead of using tin tape and brazing to join the copper tubing to the evaporator plates, a second embodiment of the present invention includes tin plating a copper tube which is then spot welded to the evaporator plates before being crushed by the dimple making tool in the manner described above. A motivation for implementing the second embodiment of the innovative evaporator plate assembly having the tin plated copper tubing is a significant increase in ice production. That is, referring to the graph shown in FIG. 11, it can be seen that conventional or standard evaporator plates KM having tin tapes and brazed copper tubes typically produces 478 pounds of ice. The all stainless steel evaporator plate assembly HK according to the preferred embodiment of the invention provides an increase in ice production of 484 pounds over the 478 pounds produced by the conventional evaporator plates KM.

Moreover, when the tin plated copper tubes are used with dimples described as HK copper (Narrow), which are narrower than the dimples 40 described above, the production of ice increases 15-16% to 555 pounds of ice. Even more significant is that when the wider dimples 40 described above—also described as HK copper (Wide)—are used, it can be seen that production of ice increases up to 25% compared with the conventional tin taped copper tubing assembly KM used in the conventional evaporator plate assembly.

The second embodiment produces more ice cubes Ic than the all stainless steel embodiment and is more resistant to corrosion due to the tin plated copper tubing, which must be counter balanced with the manufacturers concerns and costs associated the additional materials and chemicals needed with the second embodiment relative to the first, all stainless steel embodiment.

Compared to the conventional KM evaporator plate assemblies, the tin plated copper tubing or second embodiment of the present invention, HK copper (Narrow) and HK copper (Wide) eliminate the cleaning and soldering that is necessary with the conventional KM assembly, while the preferred or all stainless steel embodiment eliminates the additional manufacturing processes and materials, chemicals and the like associated therewith that are noted above.

While the invention has been described in conjunction with regards to specific aspects, it is evident that various changes and modifications may be made, and the equivalents substituted for elements thereof without departing from the true scope of the invention. In addition, many modifications may be made to adapt a particular situation or material to the teachings of the invention without departing from the scope thereof. Therefore, it is intended that this invention not be limited to the particular aspects disclosed herein, but will include all embodiments within the spirit and scope of the disclosure.

That which is claimed is:

1. A method of manufacturing an evaporator, the method comprising:
    forming a length of tubing into a serpentine path, the length of tubing forming a tubing coil;
    forming a first evaporator plate;
    forming a second evaporator plate;
    positioning the tubing coil between the first evaporator plate and the second evaporator plate;
    bringing the first evaporator plate, the second evaporator plate, and the tubing coil into contact with each other; and
    forming a plurality of dimples in each of the first evaporator plate and the second evaporator plate, wherein forming the plurality of dimples comprises forming a pair of dimples at each of a plurality of ice forming locations, thereby at least partially crushing the tubing coil at each of the plurality of ice forming locations, a surface of each of the dimples contacting the tubing coil, wherein forming the pair of dimples at each of the plurality of ice forming locations comprises forming a first dimple of the pair of dimples above the tubing coil and a second dimple of the pair of dimples below the tubing coil.

2. The method of claim 1, wherein forming a plurality of dimples in each of the first evaporator plate and the second evaporator plate comprises disposing on a corresponding front surface of each of the first evaporator plate and the second evaporator plate an array comprising a plurality of rows and a plurality of columns.

3. The method of claim 1, wherein each of the plurality of dimples projects outwardly from a rear surface of a corresponding evaporator plate.

4. The method of claim 1, wherein crushing the tubing coil at each of the plurality of ice forming locations comprises forming the tubing coil into an oval cross-section at each of the plurality of ice forming locations.

5. The method of claim 1, wherein forming the plurality of dimples in each of the first evaporator plate and the second evaporator plate comprises forming a pair of opposing side faces in each dimple of the plurality of dimples, one of the pair of opposing side faces of each dimple of the plurality of dimples contacting the tubing coil.

6. The method of claim 1, wherein the one of the pair of opposing side faces contacting the tubing coil defines a radius.

7. The method of claim 1, wherein forming the first evaporator plate comprises forming the first evaporator plate from one of stainless steel and tin plated copper tubing and forming the second evaporator plate comprises forming the second evaporator plate from the one of stainless steel and tin plated copper tubing.

8. The method of claim 1, wherein forming a plurality of dimples in each of the first evaporator plate and the second evaporator plate and partially crushing the tubing coil at each of the plurality of ice forming locations results in a surface area of each of the first evaporator plate and the second evaporator plate contacting the tubing coil after partially crushing the tubing coil being greater than a surface area of each of the first evaporator plate and the second evaporator plate contacting the tubing coil before partially crushing the tubing coil.

9. The method of claim 1, wherein forming the pair of dimples at each of the plurality of ice forming locations comprises contacting a one of the first evaporator plate and the second evaporator plate with a dimple forming tool comprising a pair of dimple dies, the pair of dimple dies comprising a dimple die for each of the pair of dimples.

10. The method of claim 9, wherein each of the pair of dimple dies is formed as one piece with the dimple forming tool.

11. The method of claim 1, further comprising forming a plurality of fins projecting outwardly from a front surface of the first evaporator plate.

12. The method of claim 11, wherein the step of forming the plurality of fins projecting outwardly from a front surface of the first evaporator plate precedes forming a plurality of dimples in each of the first evaporator plate and the second evaporator plate.

13. The method of claim 11, wherein adjacent columns of the plurality of columns are separated by a fin of the plurality of fins.

14. The method of claim 1, wherein bringing the first evaporator plate, the second evaporator plate, and the tubing coil into contact with each other further comprises joining the first evaporator plate, the second evaporator plate, and the tubing coil.

15. The method of claim 14, wherein the step of joining the first evaporator plate, the second evaporator plate, and the tubing coil is performed concurrently with the step of forming the plurality of dimples in each of the first evaporator plate and the second evaporator plate.

16. The method of claim 14, wherein joining the first evaporator plate, the second evaporator plate, and the tubing coil comprises mechanically joining the first evaporator plate to the second evaporator plate.

17. The method of claim 14, wherein joining the first evaporator plate, the second evaporator plate, and the tubing coil comprises welding the first evaporator plate to the second evaporator plate.

18. The method of claim 17, wherein the welding is one of spot welding, ultrasonic welding, and cold welding.

* * * * *